US009221601B2

(12) United States Patent
Crawford et al.

(10) Patent No.: US 9,221,601 B2
(45) Date of Patent: Dec. 29, 2015

(54) RECEPTACLE WITH FREE-FLOATING AND AUTOMATED LID

(71) Applicants: Brenda Lee Crawford, Longview, WA (US); Brian Patric Crawford, Longview, WA (US); Kyle Jordan Crawford, Pittsburgh, PA (US); Stephen Tyrel Crawford, Anchorage, AK (US)

(72) Inventors: Brenda Lee Crawford, Longview, WA (US); Brian Patric Crawford, Longview, WA (US); Kyle Jordan Crawford, Pittsburgh, PA (US); Stephen Tyrel Crawford, Anchorage, AK (US)

( * ) Notice: Subject to any disclaimer, the term of this patent is extended or adjusted under 35 U.S.C. 154(b) by 127 days.

(21) Appl. No.: 14/192,847

(22) Filed: Feb. 27, 2014

(65) Prior Publication Data

US 2014/0238986 A1 Aug. 28, 2014

Related U.S. Application Data

(60) Provisional application No. 61/770,330, filed on Feb. 28, 2013.

(51) Int. Cl.
*H02K 7/10* (2006.01)
*H02K 7/20* (2006.01)
*H02K 1/00* (2006.01)
*B65F 1/14* (2006.01)

(52) U.S. Cl.
CPC ............... *B65F 1/1638* (2013.01); *B65F 1/141* (2013.01); *B65F 2240/164* (2013.01)

(58) Field of Classification Search
CPC ............................... B65F 1/1638; B65F 1/141
See application file for complete search history.

(56) References Cited

U.S. PATENT DOCUMENTS 8,266,871 B1 * 9/2012 Stravitz .................. B65B 51/00 53/370
8,947,022 B2 * 2/2015 Shek .................... B65F 1/1638 318/139
2007/0182551 A1 * 8/2007 Yang ......................... B65F 1/08 340/545.3
2011/0074316 A1 * 3/2011 Shek .................... B65F 1/1638 318/3
2014/0184110 A1 * 7/2014 Wang ........................ B65F 1/06 318/139

* cited by examiner

*Primary Examiner* — Kristen Matter

(57) ABSTRACT

An exemplary embodiment of the present invention discloses a waste receptacle including a base having an opening, a lid detachably coupled to the base, the lid being disposed over the opening, a sensor disposed in the base, and a motor electrically connected to the sensor, wherein the motor is configured to receive a signal from the sensor and raise the lid.

14 Claims, 6 Drawing Sheets

RECEPTACLE WITH FREE-FLOATING AND AUTOMATED LID

CROSS-REFERENCE TO RELATED APPLICATION

This application claims the benefit of U.S. Provisional Patent Application No. 61/770,330, filed on Feb. 28, 2013, which is hereby incorporated by reference for all purposes as if fully set forth herein.

BACKGROUND

1. Field

Exemplary embodiments of the present invention relate to a receptacle for waste disposal. Exemplary embodiments of the present invention also relate to a receptacle that may be used as a feminine hygiene products waste receptacle.

2. Discussion of the Background

Various waste receptacles exist, but may be limited in their application. For example, depending on the type of receptacle, it may be difficult to use a receptacle for waste disposal in certain public, confined, or remote locations. A public location may have a waste receptacle that requires little physical interaction between the user and the device. Thus, an automatically operated waste receptacle may be used to reduce physical contact between the user and device, such as by allowing a lid to be lifted automatically.

However, a waste receptacle in a remote location may require minimal maintenance because it may be difficult to service a receptacle in such a location. A remote location may also require a sturdily constructed device that can withstand extensive use between service periods.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a waste receptacle that includes an automatically operable lid that may also be manually operated. The lid may be automatically operated through a motion sensor and servo mechanism, for example. The motion sensor may be any type of sensor capable of detecting a user near the lid of the device. Upon activation of the sensor, a signal is sent to the servo motor, which then raises the lid of the waste receptacle.

Exemplary embodiments of the present invention do not need to be operated only using the sensor and servo motor. The servo motor may be connected to a lever that is detached from the lid to maneuver the lid, to allow the lid to be raised and lowered without the gears thereof being engaged when the lid is manually operated by a user.

Additional features of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

An exemplary embodiment of the present invention discloses a waste receptacle including a base unit having an opening, a lid detachably coupled to the base, the lid being disposed over the opening, a sensor disposed in the base, and a motor electrically connected to the sensor, wherein the motor is configured to receive a signal from the sensor and raise the lid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figures 1A, 1B:
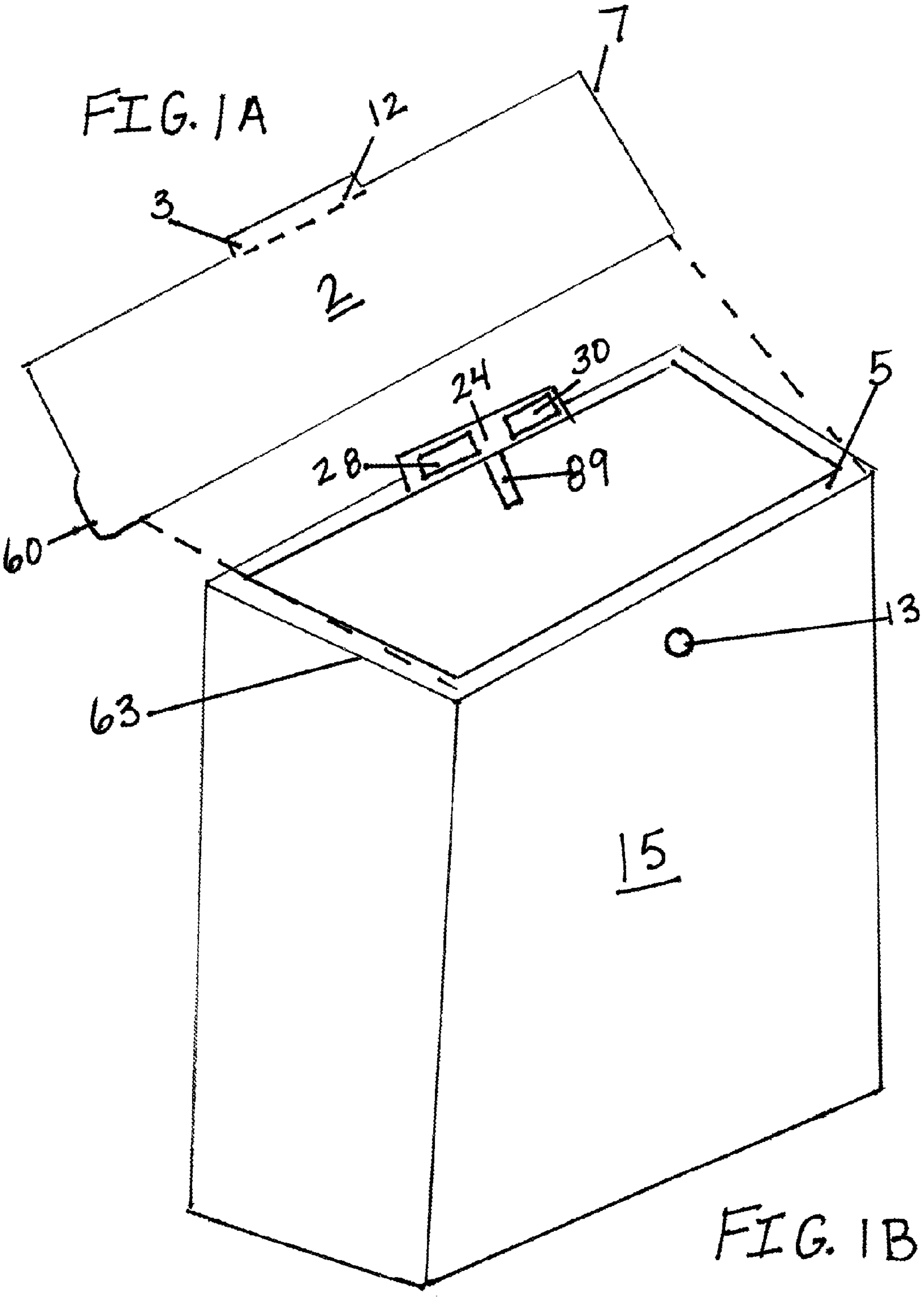
FIGS. 1A and 1B are plan views illustrating a waste receptacle according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments of the present invention generally relate to a waste receptacle. For example, the waste receptacle may be a feminine hygiene product depository to be wall mounted in public restroom stalls in women's bathrooms. The waste receptacle may be electronically actuated in order to minimize the spread of germs, which may occur by virtue of physical contact with the waste receptacle.

Figure 2:
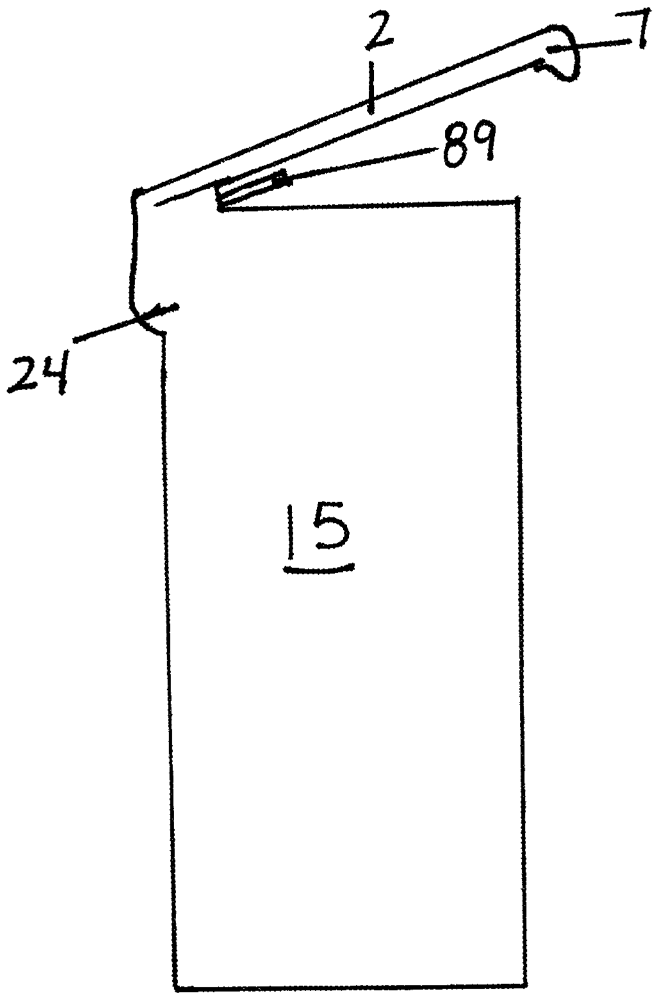
FIG. 2 is a side view illustrating the waste receptacle shown in FIG. 1.
Figure 4:
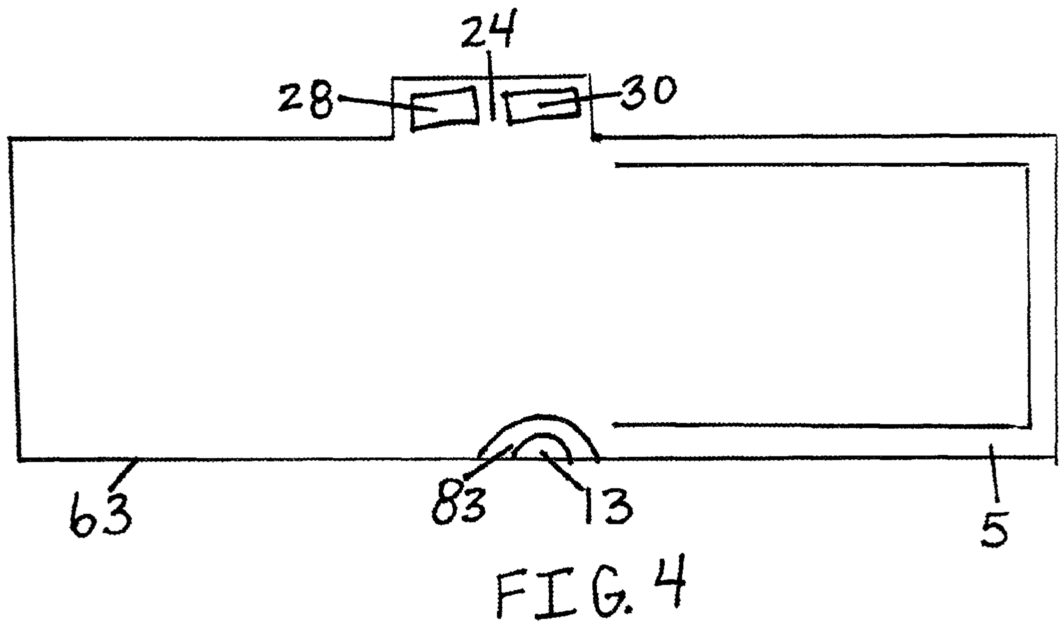
FIG. 4 is a top view illustrating the waste receptacle shown in FIG. 1.

As shown in FIGS. 1A, 1B, and 2, a waste receptacle according to an exemplary embodiment of the present invention includes a base 15 having an opening that may hold waste or a waste bag, a lid 2 to cover the opening in the base, and a hinge 12 that connects the base 15 and the lid 2. FIGS. 1A and 1B show plan views of the waste receptacle, and FIG. 2 shows a side view of the waste receptacle. A conduit 5 is arranged inside a base lip 63, and the conduit 5 may include wires for connecting a sensor to a motor 30. The lid 2 may cover the base lip 63. As mentioned above, the sensor may include any applicable type of sensor so that a user can effectuate the automatic lifting of the lid 2, and the sensor includes a sensor eye 13 in the present exemplary embodiment. The conduit 5 may protect the wires from exposure to a user, but be formed so as to allow easy access for service of the sensor, wires, and motor 30. As shown in FIG. 4, the conduit may extend along part of the inside of the base 15 adjacent to the base lip 63, according to an exemplary embodiment. The sensor may be disposed inside a sensor casing 83 (see FIG. 4) to protect the sensor from an external environment.

The motor 30 and a battery 28 to provide power to the motor 30 and the sensor are arranged in a casing 24 that is attached to the base 15. The casing 24 protects the motor 30 and battery 28 from an external environment or a user, and is arranged on an outside surface of the base 15. The casing 24 may include a locking mechanism (not shown) in order to sustain the security of components therein. Alternatively, the casing 24, motor 30, and battery 28 may be arranged on a side surface of or inside the base 15. According to the present exemplary embodiment, only a single battery 28 is used to power the motor 30, in part because the lid is sufficiently small and lightweight to reduce energy required to operate the motor 30.

Figure 3:
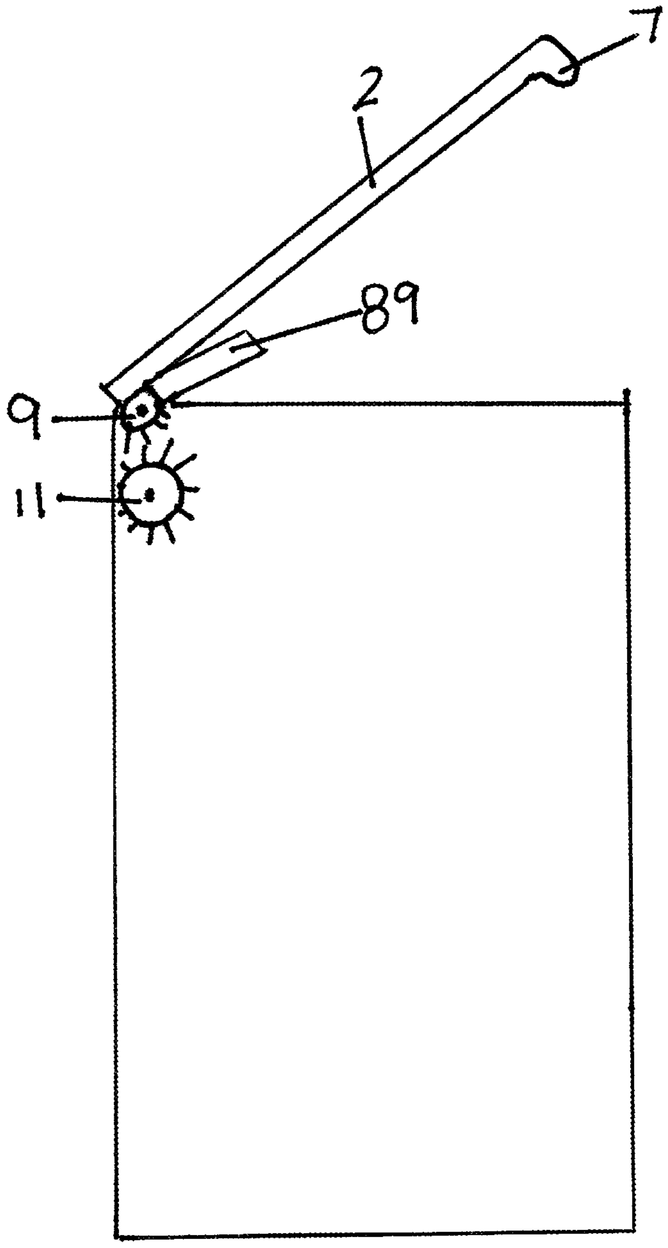
FIG. 3 is a cross-sectional view illustrating the waste receptacle shown in FIG. 1.

A lever 89 is connected to the motor 30 inside the base 15, and the lever 89 is raised or lowered according to operation of the motor 30, when the motor 30 receives a signal from the sensor. FIG. 3 is a cross-sectional view of the waste receptacle showing a first set of gears 11 attached to the motor 30, and a second set of gears 9 attached to the lever 89, and the first set of gears 11 and the second set of gears 9 are interconnected. Thus, when the motor 30 operates, the first set of gears 11 and the second set of gears 9 turn, thereby raising or lowering the lever 89. The lever 89 is detachably connected to the lid 2, and the lever 89 raises or lowers the lid 2 according to operation of the motor 30.

Figure 5:
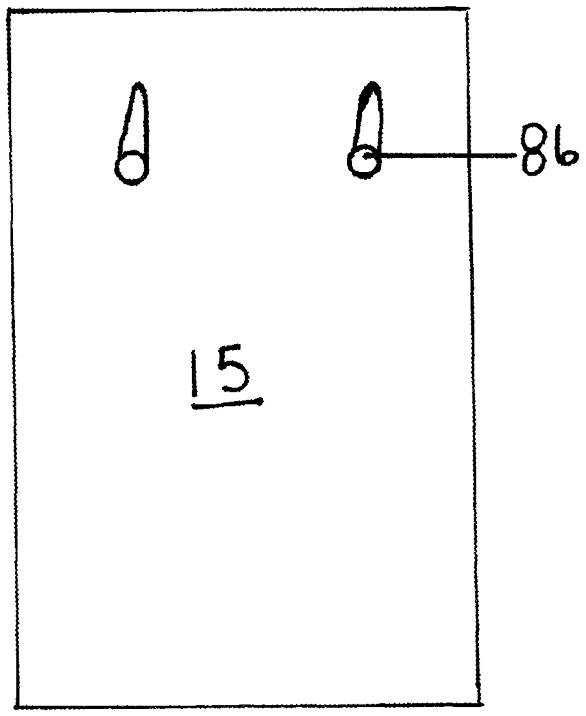
FIG. 5 is a back view illustrating the waste receptacle shown in FIG. 1.

The lever 89 may be disposed below the lid 2 at a distance sufficient to prevent wear and tear that could impair usability. According to the present exemplary embodiment, the lever 89 is disposed about ⅛ of an inch below the lid 2. The lever 89 may be connected to hinge 12. The hinge 12 is arranged between the main part of the lid 2 (i.e., the part covering the opening in the base 15) and a casing cover 3. The casing cover 3 covers the battery 28 and motor 30 and helps protect the battery 28 and motor 30. The casing cover 3 may be connected to the locking mechanism of the casing 24. The waste receptacle may also include a wall mount mechanism 86 (see FIG. 5) that allows the waste receptacle to be easily mounted to a wall surface.

FIGS. 1A and 1B show the lid 2 as being detached from the base 15, and dotted lines indicate where the lid 2 may be aligned with the base lip 63 when the lid 2 is attached to the base 15. As shown in FIG. 2, the lid 2 is attached to the base 15 at the hinge 12, and the lever 89 may be connected to the base 15 and the hinge 12. The lid 2 is mounted to the base 15 via the hinge 12, but may be detachably connected so that the lid 2 can be removed as needed to insert and remove waste disposal bags, for example. As shown in FIGS. 1 and 3, the base lip 63 has a substantially flat planar shape, but the base lip 63 may also have a concave shape as shown in FIG. 2. Alternatively, the base lip 63 may be angled towards the front of the base 15 to increase ease of material disposal. The overhang lid lip 7 is bent from the lid 2, and may cover the base lip 63 of the base 15 when the lid 2 is in a closed position. Thus, the overhang lid lip 7 may protect the inside of the waste receptacle from exposure to the outside. The manual lift lip 60 may be formed at a side of the lid 2, and allows a user to lift the lid 2 of the waste receptacle without touching the overhang lid lip 7, base lip 63, or the base 15.

The lid 2 can be raised or lowered using the manual lift lip 60 without damage to the operating mechanism of the waste receptacle. Specifically, damage may be avoided to the motor 30, the first set of gears 11, and the second set of gears 9, because of the connection between the lever 89 and the motor 30 and the other elements of the waste receptacle. As shown in FIG. 3, the lever 89 is connected to the motor 30 via the first set of gears 11 and the second set of gears 9, and the lever 89 is configured to maneuver the lid 2. That is, gears are not directly attached to the lid 2 to engage with the motor 30. The lever 89, which may be a lifting arm or other suitable element, increases the durability of the waste receptacle because it allows the lid 2 to be manually opened or closed without requiring substantial operation of the motor 30 or the gears 9 and 11. Since the lid 2 is free-floating and detachable from the lever 89, there is less resulting stress on the operating mechanism because during manual operation of the lid 2, the gears 9 and 11 do not substantially move or move the motor 30.

Figure 7:
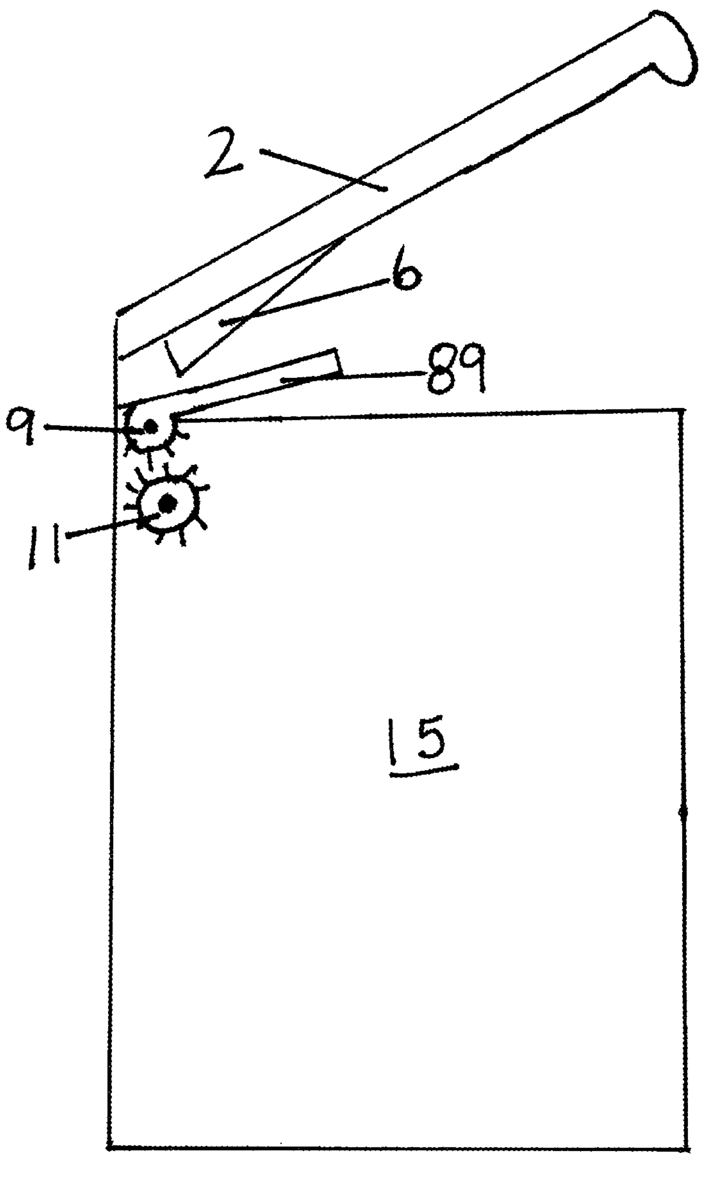
FIG. 7 is a side view illustrating a waste receptacle according to an exemplary embodiment of the present invention.

Thus, according to the present exemplary embodiment, the motor 30 receives the signal from the sensor and operates to raise the lever 89, and the lever 89 rises until it makes contact with the underside of the lid 2. In one exemplary embodiment, the lid 2 may have a protrusion 6 (FIG. 7) on a surface facing the lever 89 and corresponding to the shape of the lever 89, in order to improve efficiency of raising and lowering the lid 2 and to maintain consistent contact between the lever 89 and the lid 2. For example, the lid 2 may have a wedge-shaped protrusion corresponding to the wedge-shaped lever 89 shown in FIG. 1B. In another exemplary embodiment, the lever 89 may have an angled surface that eliminates the need for the lid 2 to have a protrusion. The lever 89 and the lid 2 continue to rise in unison until they reach the open position. As the lever 89 reverses and lowers, the lid 2 maintains contact with the lever 89 until the lever 89 and lid 2 return to their original positions. The lid 2 may be disposed at an angle such that gravity is effective to hold the lid in place on the lever 89.

Should there be a loss of electrical power to the motor 30, for example, to automatically operate the lever 89 and lid 2, the lid 2 is detachably connected to the lever 89 so that it may be manually operated without gear engagement, therefore limiting excess wear and tear on the gears 9 and 11, motor 30, and other mechanical components. If the lever 89 is in the open position when loss of power occurs, the lever 89 may be manually returned to the closed or original position to reset it until power can be restored.

Figure 6A:
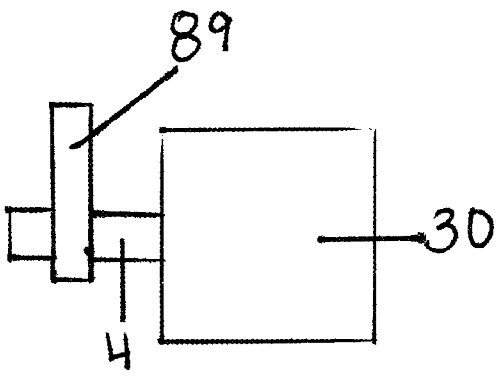
FIGS. 6A and 6B are views of a motor and lever assembly according to an exemplary embodiment of the present invention.
Figure 6B:
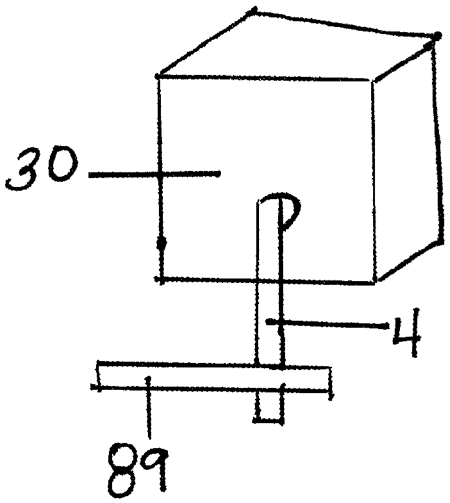

As shown in FIGS. 6A and 6B, according to another exemplary embodiment of the present invention, the lever 89 may be connected to the motor 30 via a link arm 4. For example, the link arm 4 may be a rod. The link arm 4 may have gear 11 attached thereto allowing the link arm 4 to help raise the lever 89 when the motor 30 operates. The lever 89 may have gear 9 attached thereto, allowing interconnection of gears 9 and 11 as shown in FIG. 3 and corresponding operation as described above.

The waste receptacle may generally be formed of any material suitable for use as a waste receptacle, such as metal or plastic. For example, it is possible to use recycled materials to form the waste receptacle, including biodegradable or compostable material.

As described herein, exemplary embodiments of the present invention relate to a receptacle that may be used as a feminine hygiene products waste receptacle. These exemplary embodiments allow the user of said receptacle to reduce the risk of contact with contaminants which are present by virtue of its nature.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A waste receptacle, comprising:

a base having an opening;

a lid detachably coupled to the base, the lid being disposed over the opening;

a sensor disposed in the base;

a motor electrically connected to the sensor, and a lever connected to the motor;

wherein the motor is configured to receive a signal from the sensor and raise the lid; and wherein the lever is disposed between the lid and the motor and configured to directly contact the lid only when the motor raises the lid in response to the signal from the sensor.

2. The waste receptacle of claim 1, wherein the base comprises a base lip surrounding the base opening, wherein:

the base lip comprises a conduit, and a wire connecting the sensor and the motor is disposed in the conduit.

3. The waste receptacle of claim 2, wherein the motor and the lever are disposed inside the base.

4. The waste receptacle of claim 3, further comprising gears connecting the motor and the lever, wherein the gears are configured to move the lever when the motor receives the signal from the sensor.

5. The waste receptacle of claim 4, wherein the lid is detachably coupled to the base via a hinge.

6. The waste receptacle of claim 5, wherein the lever is connected to the hinge.

7. The waste receptacle of claim 6, wherein the base lip is angled towards a front of the base.

8. The waste receptacle of claim 7, wherein the lever comprises a wedge shape, and the lid comprises a wedge-shaped protrusion corresponding to the lever.

9. The waste receptacle of claim 5, further comprising a casing connected to the base, wherein the motor is disposed in the casing.

10. The waste receptacle of claim 9, further comprising a battery electrically connected to the motor, the battery being disposed in the casing.

11. The waste receptacle of claim 10, wherein the lid comprises a casing cover disposed on the casing, and wherein the hinge is disposed between the casing cover and a main portion of the lid.

12. The waste receptacle of claim 11, wherein the lid further comprises an overhang lid lip configured to cover the base lip and the conduit.

13. The waste receptacle of claim 12, wherein the lid further comprises a manual lift lip, the manual lift lip extending from the main portion of the lid.

14. The waste receptacle of claim 1, wherein the lever is detachably coupled to the lid.

* * * * *